June 4, 1957 O. RODRIGUEZ 2,794,591
ELECTRIC FAN
Filed Oct. 31, 1956
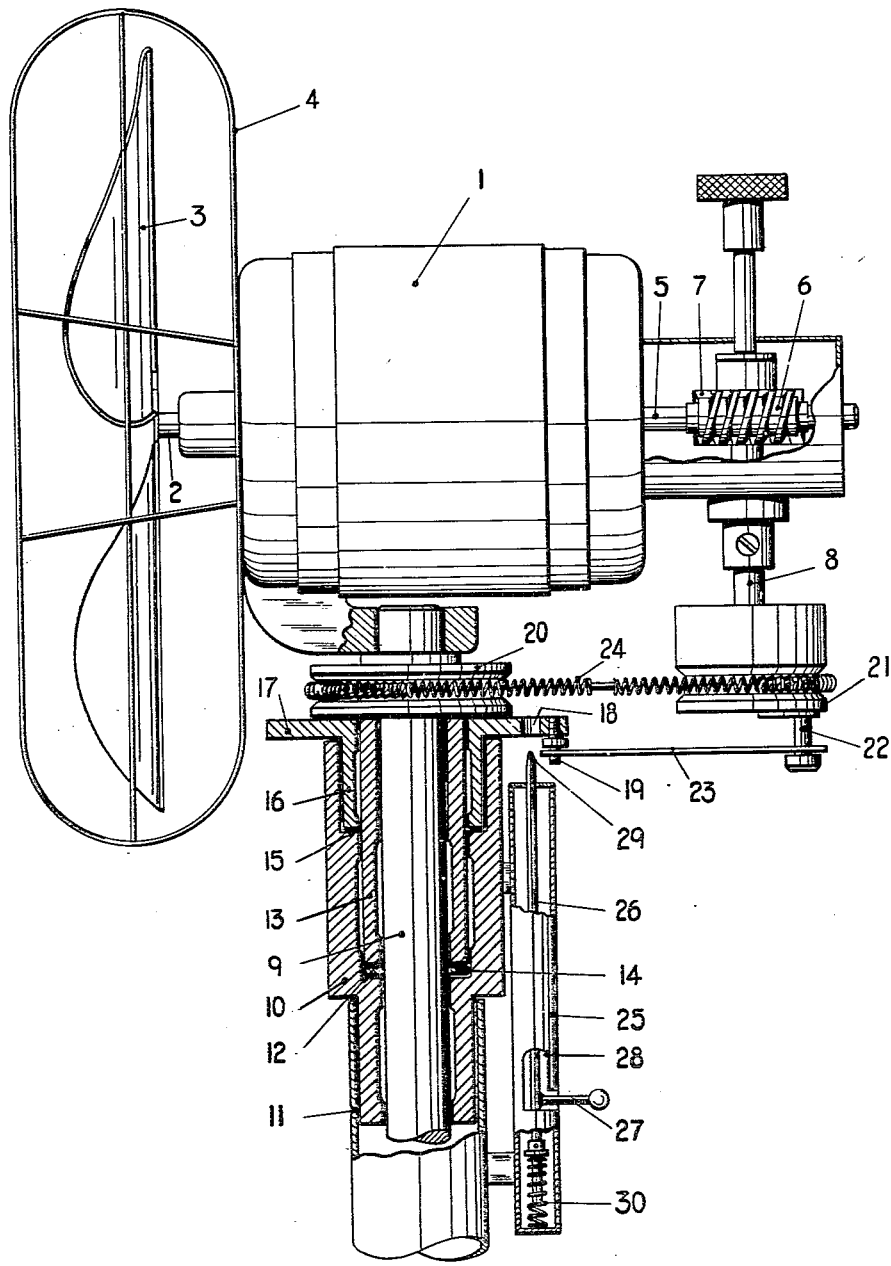
INVENTOR.
Osvaldo Rodriguez
BY Ernest J Montague
attorney

United States Patent Office 2,794,591
Patented June 4, 1957

2,794,591
ELECTRIC FAN
Osvaldo Rodriguez, Buenos Aires, Argentina

Application October 31, 1956, Serial No. 619,419

6 Claims. (Cl. 230—253)

The present invention relates to electric fans performing multiple motions and, more particularly, to means designed to perform such motions, as a turning motion upon the shaft supporting the fan itself.

It is one object of the present invention to provide a structure for selective operation of one or more motions of a fan which structure is comparatively economical and easy to maintain.

It is another object of the present invention to provide a structure for operation of an electric fan which structure comprises a few parts and which parts permit of easy assembly.

With these and other objects in view which will become apparent in the following detailed description, the present invention will be clearly understood in connection with the accompanying drawing, in which the only figure is a side elevation partly in section of a fan in accordance with the present invention.

Referring now to the drawing, the fan comprises a conventional motor 1 from which a shaft 2 projects. The latter carries a set of blades 3 surrounded by a cage 4, whereas the opposite end 5 of the driving shaft 2 projects rearwardly from the motor casing 1 and terminates in a gear 6 meshing with a pinion 7 which is mounted on a downwardly extending axle 8 forming an angle of 90° with respect to the driving shaft 2. The above described basic structure is more or less conventional.

In accordance with the present invention, the casing of the motor 1 is connected by means of its lower central part to a supporting shaft 9 which is mounted for free rotation within a sleeve member 10 which is carried by a hollow pole 11, the lower end of which terminates in a socket (not shown). The sleeve member 10 may be formed also as an integral part of the hollow pole 11, though this arrangement turned out to be more expensive. The lower end of the supporting shaft 9 is fitted within the sleeve member 10 in a manner to permit free rotation therein. The sleeve member 10 is provided inside with an inner shoulder 12, on which the lower end of a sleeve 13 rests, the latter being disposed within the sleeve member 10, to permit free rotation. Between the lower end of the sleeve 13 and the shoulder 12 may be inserted a washer 14, or a thrust ball bearing (not shown). The sleeve 13 can freely revolve within the supporting member 10, as stated before, and the supporting shaft 9 of the fan is also freely rotatable in said sleeve 13. The sleeve member 10 has inside a second shoulder 15 adapted to support the lower end of a second sleeve 16 which turns freely within the sleeve member 10 and, surrounds the sleeve 13.

The sleeve 16 terminates, at its upper end, in a circular plate 17 which is provided with a plurality of small circular holes 18 equally spaced apart along a circle of predetermined radius of the plate 17. This radius is of a length greater than that of the outer face of the sleeve member 10. The plate 17 is provided with a bolt 19 adjacent its outer circumference.

The sleeve 13 projects upwardly into a pulley 20.

The lower end of the axle 8 projects into a pulley 21 which is provided with an eccentric bolt 22. This bolt 22 of the pulley 21 is connected with the bolt 19 of the plate 17 by means of a connecting rod 23 of a slightly curved shape.

The two pulleys 20 and 21 are connected for common operation by a transmission belt 24 of any suitable material, as for instance, a spiral belt. In order to avoid slippings of this belt in the grooves of the pulleys, the latter can be provided with conventional means for preventing such slipping at the bottom of the respective grooves, at least at two oppositely disposed points 180° apart. On the outside of the hollow pole 11, or of the sleeve member 10 a tube 25 is secured thereto substantially parallel with the sleeve member 10 and receiving means for retaining the plate 17 in any desired position. This means comprises a stem 26 which slides longitudinally within the tube 25 and is equipped with a gripping bar 27 projecting through a slot 28 of the tube 25. The slot 28 is L-shaped, the longer arm of the L disposed in the longitudinal direction of the tube 25. The upper end 29 of the stem 26 projects outside the tube 25. Moreover a spring 30 is supported between the lower end of the stem 26 and the bottom of the tube 25, which spring 30 tends to push the stem 26 normally in upward direction. When the gripping bar 27 is shifted into the short arm of the L forming the slot 28, the projecting top end of the stem remains without any engagement with the plate 17, and the spring 30 is compressed. When the gripping bar 27 is, however, shifted from the short arm of the slot 28, so that the gripping bar 27 can slide longitudinally along the long arm of the L, the spring 30 can expand pushing the stem 26 in upward direction, so that the projecting end 29 of the stem 26 engages the plate 17 and, when the latter turns, the stem 26 enters one of the holes 18, whereby it stops the plate 17 from any further rotation.

The unit consisting of the end of the driving shaft 5, the gear 6, the pinion 7 and the axle 8, may be equipped with a clutch (not shown), which permits of selective operative connection of the axle 8.

In order to bring about in addition to the operation of the fan also an oscillating motion of up to 90°, the clutch is operated, so that the rotation of end 5 of the driving shaft 2 is transmitted to the axle 8, and at the same time the gripping bar 27 is shifted into the long arm of the L, so that the upper end 29 of the stem 26 may enter a hole 18 of the plate 17. The rotation of the axle 8 transmitted to the bolt 22, which with the connecting rod 23 converts the rotary motion into a rectilinear reciprocating one, which, through the stopping of the plate 17, transforms itself into an alternative rotary motion of the whole assembly of the motor with the blades of the fan, over an angle of 90°. At the same time, the rotation of the pulley 21 and the belt 24 causes rotation of the pulley 20 and its sleeve 13, without intervening in the motion of the assembly of the motor and of the blades. It is understood that, in view of the bolt 22 and the connecting rod 23, this motion can be performed over an angle of more or less than 90°, in accordance with the requirements.

To obtain a continuous rotary motion, it will suffice to withdraw the stem 26 and shifting the gripping bar 27 into the short arm of the L of the slot 28, so that the upper end 29 of the stem 26 withdraws from the hole 18 of the plate 17. In this way, the motion of the bolt 22 and of the connecting rod 23 bring about oscillation of the plate 17 and the sleeve 16, which can now move freely, so that it does not cause any reaction from the assembly of the fan itself and thus does not interfere in its motion. In return, the pulley 21 transmits rotation through the belt 24, thereby turning the pulley 20 of the sleeve 13. However, by the frictions of the system, the resistance which is met for turning the entire unit of the motor and the blades of the fan is less than the resistance met by the pulley 20 and the sleeve 13, to rotate independently. This will bring about the rotation of the entire unit of the motor and the blades and result in continuous rotation about the geometrical axis of the supporting shaft 9.

Though the present invention has been described with reference to a preferred embodiment, it will be understood that it is possible to introduce in it different changes and alterations without abandoning the basic concept of the present invention. For instance, in order to avoid that, for lack of lubrication or due to accumulation of dirt, the supporting shaft 9 finds a resistance superior to free rotation than that found in the sleeve 13, retaining means may be provided for the sleeve 13 which means may be combined with the stem 26, so that when the stem 26 retains the plate 17, the sleeve 13 is released, whereas, when the stem 26 releases the plate 17, the sleeve 13 is retained. It is possible, too, to provide only one hole 18 in the plate 17, or two or more, up to a substantial plurality of such holes 18, distributed equidistantly around the plate 17. It is also possible to provide retaining means different from the stem 26, provided they function substantially in the same manner. The transmission between the two pulleys 20 and 21 may be achieved by a leather belt, a chain and chain wheel, instead of the pulleys, or similar suitable means.

While I have disclosed one embodiment of the present invention, it is to be understood that this embodiment is given by example only and not in a limiting sense, the scope of the present invention being determined by the objects and the claims.

I claim:

1. An electric fan comprising an electric motor including a housing and a first shaft driven by said motor, an axle crossing said shaft at an angle of substantially 90°, meshing gear means secured to said gear and said axle, respectively, a clutch member adapted for selective disconnection of said axle from said first shaft, and a main hollow supporting member for said fan, a bracket projecting from said housing of said electric motor and having a bore, a supporting shaft rotatably mounted in said supporting member and one end of said supporting shaft being received by said bore of the said bracket, and a first sleeve member freely rotatable between said main supporting member and said supporting shaft, said first sleeve member carrying a first pulley, and a second sleeve member freely rotatable between said first sleeve member and said main supporting member and its upper end being flanged outwardly to form a plate, a second pulley carried by said axle and having a first bolt projecting axially therefrom, a second bolt projecting axially from said plate, and a connecting rod connecting said bolts, belt means connecting said first and second pulleys, and releasable means for retaining said plate and, thereby, said second sleeve in any predetermined position.

2. The fan, as set forth in claim 1, in which said belt means comprises a spiral metal band.

3. The fan, as set forth in claim 1, in which said plate has at least one bore adjacent its edge, and which includes a cylindrical housing and a stem axially movable in said housing and resilient means for urging said stem into advanced position to be received by said bore, and means for retaining said stem in its withdrawn position.

4. The fan, as set forth in claim 3, in which said resilient means comprises a spring disposed between the bottom of said cylindrical housing and the bottom of said stem.

5. The fan, as set forth in claim 3, in which said means for retaining said stem in its withdrawn position comprises a gripping arm extending laterally from said stem and adapted to abut a horizontal arm of an L slot provided in said cylindrical housing.

6. The fan, as set forth in claim 1, in which said plate has a plurality of bores spaced equally apart along a circle adjacent the edge of said plate.

References Cited in the file of this patent

UNITED STATES PATENTS

| | | |
|---|---|---|
| 1,373,480 | Brainerd | Apr. 5, 1921 |
| 1,597,752 | Aalborg | Aug. 31, 1926 |
| 1,659,501 | Smith | Feb. 14, 1928 |
| 1,767,060 | Ferguson | June 24, 1930 |
| 1,879,150 | Ferguson | Sept. 27, 1932 |
| 2,725,184 | Mucci | Nov. 29, 1955 |